(12) United States Patent
Kim et al.

(10) Patent No.: US 11,203,165 B2
(45) Date of Patent: Dec. 21, 2021

(54) METHODS AND APPARATUS FOR EMBEDDING A WIRE INTERMITTENTLY

(71) Applicant: Board of Regents, The University of Texas System, Austin, TX (US)

(72) Inventors: Chi Yen Kim, El Paso, TX (US); Ryan Wicker, El Paso, TX (US); David Espalin, El Paso, TX (US); Charlie Sullivan, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 90 days.

(21) Appl. No.: 16/459,325

(22) Filed: Jul. 1, 2019

(65) Prior Publication Data

US 2020/0009801 A1 Jan. 9, 2020

Related U.S. Application Data

(60) Provisional application No. 62/693,817, filed on Jul. 3, 2018.

(51) Int. Cl.
*B29C 65/44* (2006.01)
*B29C 65/00* (2006.01)
*B29C 64/188* (2017.01)

(52) U.S. Cl.
CPC ............ *B29C 65/44* (2013.01); *B29C 64/188* (2017.08); *B29C 66/742* (2013.01); *B29C 66/9261* (2013.01)

(58) Field of Classification Search
CPC ........ B29C 70/82; B29C 65/44; B29C 66/742; B29C 64/295; B29C 64/20; B29C 64/188; H05K 3/103; H05K 3/222; H05K 7/06; B33Y 10/00; B33Y 30/00
USPC .................................... 29/850; 156/166, 433
See application file for complete search history.

(56) References Cited

U.S. PATENT DOCUMENTS

| | | | | |
|---|---|---|---|---|
| 3,674,914 | A | * 7/1972 | Burr | ........................ H05K 3/103 |
| | | | | 174/261 |
| 2017/0064840 | A1* | 3/2017 | Espalin | .................. H05K 3/103 |
| 2018/0281279 | A1* | 10/2018 | Barocio | ................ B29C 64/295 |

FOREIGN PATENT DOCUMENTS

JP 55063832 A * 5/1980 ............. H01L 24/78

OTHER PUBLICATIONS

Machine translation of JP 55063832 date unknown.*

* cited by examiner

*Primary Examiner* — John L Goff, II
(74) *Attorney, Agent, or Firm* — Yee & Associates, P.C.

(57) ABSTRACT

A wire embedding system and methods are presented. A wire is embedded in a substrate at predetermined locations in a series of sequential embedding instances using heat and pressure. The heat and pressure are removed from the wire in between the series of sequential embedding instances.

20 Claims, 16 Drawing Sheets

METHODS AND APPARATUS FOR EMBEDDING A WIRE INTERMITTENTLY

BACKGROUND INFORMATION

1. Field

The present disclosure relates generally to manufacturing processes, and more specifically, to embedding wire into a substrate. Yet more specifically, the present disclosure presents methods and an apparatus for embedding a wire in a series of sequential embedding instances.

2. Background

Growing numbers of platforms are being designed and manufactured with embedded sensors and electronics. Growing numbers of platforms are being manufactured using additive manufacturing techniques and multiple materials. Embedding wires directly into substrates during manufacturing allows for design of more complex platforms.

Increasing the complexity of platform geometries may increase the difficulty of embedding wires into the platforms. Maneuvering continuous wire embedding systems on complex geometries may be more difficult than desired. Further, maneuvering continuous wire embedding systems on complex geometries may result in inconsistencies in the embedded wire.

Therefore, it would be desirable to have a method and apparatus that takes into account at least some of the issues discussed above, as well as other possible issues.

SUMMARY

An illustrative embodiment of the present disclosure provides a method. A first portion of wire is embedded into a substrate at a first location using a wire embedding system comprising a heating element and a wire positioning system. The wire positioning system is lifted away from the substrate. The wire positioning system is moved in a first direction relative to the substrate. A second portion of the wire is embedded into the substrate at a second location using the wire embedding system.

Another illustrative embodiment of the present disclosure provides a method. A wire is embedded in a substrate at predetermined locations in a series of sequential embedding instances using heat and pressure. The heat and pressure are removed from the wire in between the series of sequential embedding instances.

Yet another illustrative embodiment of the present disclosure provides a wire embedding system. The wire embedding system comprises a heating element and a wire positioning system movably connected to the heating element and configured to align a wire beneath a contact surface of the heating element.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
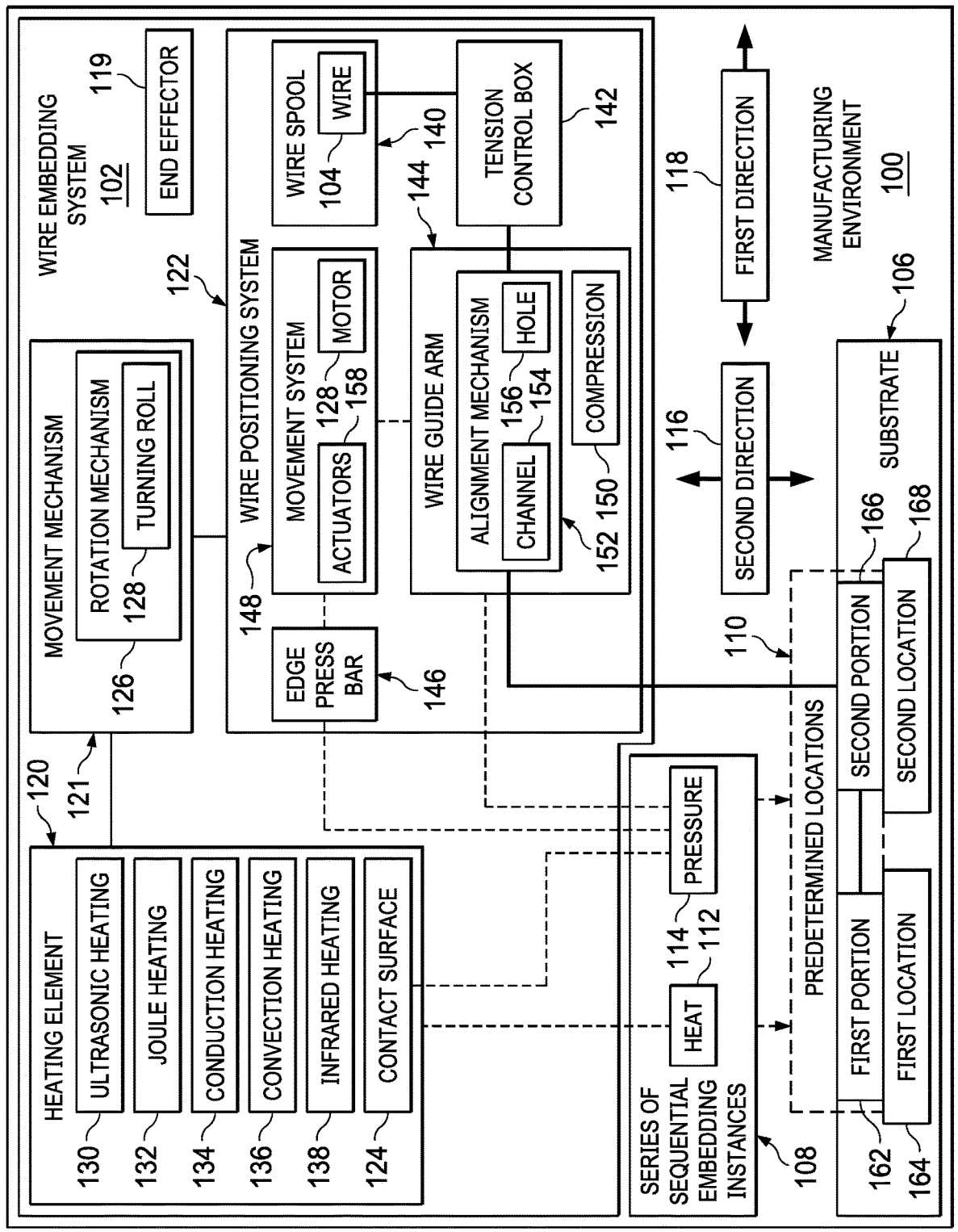
FIG. 1 is an illustration of a block diagram of a manufacturing environment in which a wire is embedded in a substrate using a wire embedding system in accordance with an illustrative embodiment.

The illustrative embodiments recognize and take into account one or more different considerations. For example, the illustrative embodiments recognize and take into account that the conventional method of embedding metal wire on a substrate with selective energy has proven undesirably difficult to embed wire in short length, sharp corners, or tight, close knit patterns. The illustrative embodiments recognize and take into account that continuous heat energy for melting a substrate is easily transferred along previously embedded wire when the material of the wire has a high heat conductivity. The illustrative embodiments recognize and take into account that conducted heat can increase the temperature of the wire and melt the substrate again, dislodging previously embedded wire from the substrate.

The illustrative examples recognize and take into account that in three-dimensional printed applications, wire embedding can be implemented during the three-dimensional printing process. The illustrative examples recognize and take into account that embedding during three-dimensional print present technical considerations.

The illustrative examples recognize and take into account that it is undesirably difficult to form sharp corners in an embedded solid metal wire on substrates. The illustrative examples recognize and take into account that when thicker, solid metal, wire, is used the wire has resilient characteristics of the metal. For example, increasing the wire diameter causes a greater increase in bending force. The illustrative examples recognize and take into account that small changes in wire size could cause a large change in tool force application. In one example, doubling a wire radius would quadruple bending force. Because of the resilient characteristics of metal, the wire is bent at the corner of the pattern with a force strong enough to make a wire permanently deformed. The illustrative examples recognize and take into account that for thicker wire in conventional embedding systems creating a corner of a pattern may cause undesirable damage to the substrate. The illustrative examples recognize and take into account that for thicker wire in conventional embedding systems creating a corner of a pattern may pull out a previously embedded portion of the wire.

The illustrative embodiments recognize and take into account that in conventional wire embedding systems, maintaining tension is not possible. The illustrative embodiments recognize and take into account that in conventional wire embedding systems cannot intermittently embed wire.

The illustrative examples present methods of discontinuous wire embedding. The illustrative examples present methods that perform an intermittent process for embedding the wire at prescribed intervals. The illustrative examples present an apparatus and method for forming a sharp edge at the corner with solid metal wire during embedding it on a substrate. The illustrative examples present a wire embedding system comprising a heating element and a wire positioning system. In some illustrative examples, the wire positioning system comprises an edge press bar and a tension control box. The illustrative examples present a method including fixing a wire at a corner using an edge press bar and pulling a wire to turning direction by tension control.

Referring now to the figures and, in particular, with reference to FIG. 1, an illustration of a block diagram of a manufacturing environment in which a wire is embedded in a substrate using a wire embedding system is depicted in accordance with an illustrative embodiment. Manufacturing environment 100 includes wire embedding system 102 configured to embed wire 104 in substrate 106. Wire embedding system 102 is configured to embed wire 104 in a discontinuous process. Wire 104 may be formed of any desirable material such as a conductive material, a non-conductive material, an optical fiber, or any other desirable form of wire. In some illustrative examples, wire 104 is a conductive material such as a metal, a metal alloy, a conductive polymer, or any other desirable type of conductive material.

Wire embedding system 102 intermittently embeds wire 104 in substrate 106. Substrate 106 is formed of any desirable material and has any desirable shape. In some illustrative examples, material of substrate 106 takes the form of a thermoplastic material or a thermoplastic composite material. A thermoplastic composite material is a thermoplastic material filled with another material to control or modify material characteristics of substrate 106.

Wire embedding system 102 is used to embed wire 104 in substrate 106 at predetermined locations 110 in series of sequential embedding instances 108 using heat 112 and pressure 114. Heat 112 and pressure 114 are not applied to wire 104 in between series of sequential embedding instances 108.

Portions of wire embedding system 102 move towards substrate 106 to embed wire 104 in substrate 106. After embedding wire 104, portions of wire embedding system 102 are lifted away from substrate 106 to remove heat 112 and pressure 114 from wire 104. In some illustrative examples, movement towards or away from substrate is described as movement in second direction 116.

Between series of sequential embedding instances 108, at least portions of wire embedding system 102 move in first direction 118 relative to substrate 106. In some illustrative examples, wire embedding system 102 takes the form of end effector 119. In these illustrative examples, all of wire embedding system 102 moves in first direction 118 relative to substrate 106.

In some illustrative examples, heating element 120 is separate from other components of wire embedding system 102. In some of these illustrative examples, heating element 120 may be stationary. In some of these illustrative examples, heating element 120 may move independently of the remainder of wire embedding system 102.

At least portions of wire embedding system 102 move relative to substrate 106 to move between predetermined locations 110. In some illustrative examples, second direction 116 is perpendicular to first direction 118.

Wire embedding system 102 comprises heating element 120 and wire positioning system 122 moveable relative to heating element 120. In some illustrative examples, wire embedding system 102 comprises heating element 120 and wire positioning system 122 are not physically connected. In these illustrative examples, wire positioning system 122 may be part of end effector 119 separate from heating element 120. In some of these illustrative examples, heating element 120 may be part of a separate end effector that moves independently of end effector 119. In some of these illustrative examples, heating element 120 may be a global rather than a localized heating element.

Heating element 120 can be located at any desirable position within manufacturing environment 100. Heating element 120 directs its heating at a location. Heating element 120 directs its heating at the center of the axis of rotation for wire positioning system 122.

In some illustrative examples, wire embedding system 102 comprises heating element 120 and wire positioning system 122 movably connected to heating element 120 and configured to align wire 104 beneath contact surface 124 of heating element 120. In these illustrative examples, wire embedding system 102 is movably connected to heating element 120 in any desirable fashion. As depicted, wire embedding system 102 is connected to heating element 120 using movement mechanism 121.

In some illustrative examples, wire embedding system 102 comprises heating element 120 and wire positioning system 122 rotatably connected to heating element 120 and configured to align wire 104 beneath contact surface 124 of heating element 120. As depicted, movement mechanism 121 may take the form of rotation mechanism 126. In these illustrative examples, rotation mechanism 126 connects heating element 120 to wire positioning system 122. Rotation mechanism 126 takes any desirable form that allows wire positioning system 122 to rotate about heating element 120. In some illustrative examples, rotation mechanism 126 takes the form of turning roll 128. In some illustrative examples, rotation mechanism 126 takes the form of a rotation bearing a turning wheel.

Heating element 120 takes any desirable form to provide heat to embed wire 104 in substrate 106. In some illustrative examples, heating element 120 may be referred to as a selective energy tool. Heating element 120 provides at least one of ultrasonic heating 130, joule heating 132, conduction heating 134, convection heating 136, or infrared heating 138. In some illustrative examples, a three-dimensional printer extruder can be substituted as the selective energy tool, heating element 120. In these illustrative examples, the three-dimensional printer extruder is continuously heated to maintain molten printing material inside the extruder. In these illustrative examples, the heated end of a nozzle of the three-dimensional printer extruder also supplies heat to wire 104 to enable wire 104 to penetrate under substrate 106.

When wire 104 is embedded in substrate 106 during a three-dimensional printing process, if wire 104 would obstruct the next layer in a three-dimensional printing process, a cavity or channel may be included in the design for substrate 106 such that wire 104 is set in below the height of the surface of substrate 106. In some illustrative examples, the cavity or channel is in a model for substrate 106. In some illustrative examples, the cavity or channel is machined into substrate 106 as a post process.

In some illustrative examples, material may be extruded during the embedding process to provide adhesion and reinforcement to the position at which wire 104 is embedded. The process of preheating wire 104 and substrate 106 is performed for substrate 106 to desirably adhere and bond to the surface of wire 104.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

When substrate 106 takes the form of a thermoplastic material, heat 112 applied by heating element 120 heats wire 104 and substrate 106, including heating substrate 106 to a flowable state. A flowable state may also be referred to as a rubbery flow region or liquid flow region of viscoelastic behavior. By heating of the thermoplastic substrate material 106 to a flowable state, pressure 114 applied to wire 104 embeds wire 104 within substrate 106. Pressure 114 is maintained on wire 104 until substrate 106 is cooled to a temperature at which substrate 106 is no longer flowable.

As depicted, wire positioning system 122 comprises wire spool 140 storing wire 104; tension control box 142 configured to provide a set amount of tension to wire 104; wire guide arm 144 configured to guide wire 104; edge press bar 146 configured to apply pressure to wire 104; and movement system 148 configured to move wire guide arm 144 and edge press bar 146 independently of each other. Wire spool 140 supplies wire 104 to wire positioning system 122. Wire spool 140 has any desirable size, shape, or design.

Tension control box 142 feeds and pulls wire 104 with a desired amount of tension. Tension keeps wire 104 straight and in a desired position. Tension also lifts any excess wire 104 that has been embedded beyond an intended position, such as predetermined locations 110. More specifically, tension lifts any excess wire 104 that was embedded beyond first location 164 as wire embedding system 102 moves towards second location 168.

Wire guide arm 144 is configured to guide wire 104 and provide compression 150 to wire 104. Wire guide arm 144 applies compression 150 to wire 104 to keep wire 104 in place during embedding.

Wire guide arm 144 has alignment mechanism 152 to guide wire 104 between tension control box 142 and heating element 120. Alignment mechanism 152 takes any desirable form. In some illustrative examples, alignment mechanism 152 takes the form of one of channel 154 or hole 156.

In some illustrative examples, wire guide arm 144 is moved towards substrate 106 before moving other components of wire embedding system 102 towards substrate 106. Components of wire embedding system 102, including wire guide arm 144, edge press bar 146, and heating element 120 are independently moveable.

Edge press bar 146 presses wire 104 to substrate 106 close to contact surface 124 of heating element 120. Having edge press bar 146 close to contact surface 124 of heating element 120 allows for wire embedding system 102 to turn a corner accurately.

In some illustrative examples, edge press bar 146 fixes wire 104 in place to produce a corner in a pattern. Edge press bar 146 reduces wire 104 pulling out from substrate 106 during bending of wire 104 while turning a corner. Edge press bar 146 releases the effect of the resilient characteristics of wire 104.

Edge press bar 146 presses wire 104 to apply at least a portion of pressure 114 during series of sequential embedding instances 108. In some illustrative examples, edge press bar 146 remains in contact with wire 104 after lifting heating element 120 away from substrate 106. In some illustrative examples, edge press bar 146 remains in contact with wire 104 until substrate 106 cools sufficiently.

Movement system 148 is configured to control rotation of wire positioning system 122 relative to heating element 120. Movement system 148 is also configured to control movement of wire guide arm 144 and edge press bar 146. Movement system 148 is configured to move each of wire guide arm 144 and edge press bar 146 independently from each other. In some illustrative examples, movement system 148 comprises at least one of actuators 158 or motor 160.

Wire embedding system 102 embeds wire 104 in substrate 106 in an intermittent process of movement. Wire embedding system 102 embeds wire 104 in substrate 106 in series of sequential embedding instances 108. Series of sequential embedding instances 108 includes any desirable quantity of embedding instances.

For example, wire embedding system 102 embeds first portion 162 of wire 104 into substrate 106 at first location 164 and wire embedding system 102 embeds second portion 166 of wire 104 into substrate 106 at second location 168.

After embedding first portion 162 of wire 104, components of wire embedding system 102 are lifted away from substrate 106 and moved relative to substrate 106 towards second location 168. In some illustrative examples, components of wire embedding system 102, including heating element 120, wire guide arm 144, and edge press bar 146 are lifted away from substrate 106 independently then wire embedding system 102 is moved relative to substrate 106 towards second location 168. In some illustrative examples, components of wire embedding system 102 are lifted independently and then the whole of wire embedding system 102 is further lifted prior to moving wire embedding system 102 relative to substrate 106 towards second location 168.

Wire embedding is performed through series of sequential embedding instances 108. Each of series of sequential embedding instances 108 embeds a respective portion of wire 104 in substrate 106. In some illustrative examples, each of series of sequential embedding instances 108 is performed using a same process.

Wire embedding system 102 moves to a new location away from the previous embedding location. As depicted, wire embedding system 102 moves away from first location 164 towards second location 168. Heating element 120, edge press bar 146, and wire guide arm 144 are lifted to allow movement. Once at the new position, wire guide arm 144 is lowered to place wire 104 close to substrate 106. Heating element 120 is then lowered to provide heat 112 to wire 104 and surrounding substrate 106 in preparation for the embedding operation.

Once prepared, heating element 120 then embeds wire 104 into substrate 106. With wire 104 embedded in substrate, edge press bar 146 is lowered to keep wire 104 in place. Wire guide arm 144 is lifted to pull up any extra wire length that may have been embedded beyond the edge press bar 146. Heating element 120 is lifted to remove heat 112 from the area and cool wire 104 and substrate 106 while edge press bar 146 remains in place to preserve accurate positioning. Edge press bar 146 is lifted, and the process can start over again at the next desired position of predetermined locations 110.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, as depicted first direction 118 and second direction 116 are perpendicular to each other. In some illustrative examples first direction 118 and second direction 116 may not be perfectly perpendicular. For example, substrate 106 may have a complex curvature. In these examples, when substrate 106 has a complex curvature, lifting wire embedding system 102 may be done in more than one axis relative to substrate 106. manufacturing environment 100. In some examples, when substrate 106 has a complex curvature, moving wire embedding system 102 between predetermined locations 110 may be done in more than one axis relative to substrate 106.

As another example, although predetermined locations 110 is depicted as having only two locations: first location 164 and second location 168, predetermined locations 110 may have any desirable quantity of locations. As yet another example, wire embedding system 102 may be communicably connected to any desirable control system such as a computer system or computer numerical control (CNC) controller. As yet a further example, wire embedding system 102 may take the form of an end effector connected to any desirable drive system such as a gantry system, robotic arm, autonomous robotic vehicle, or any other desirable drive system.

Figure 2:
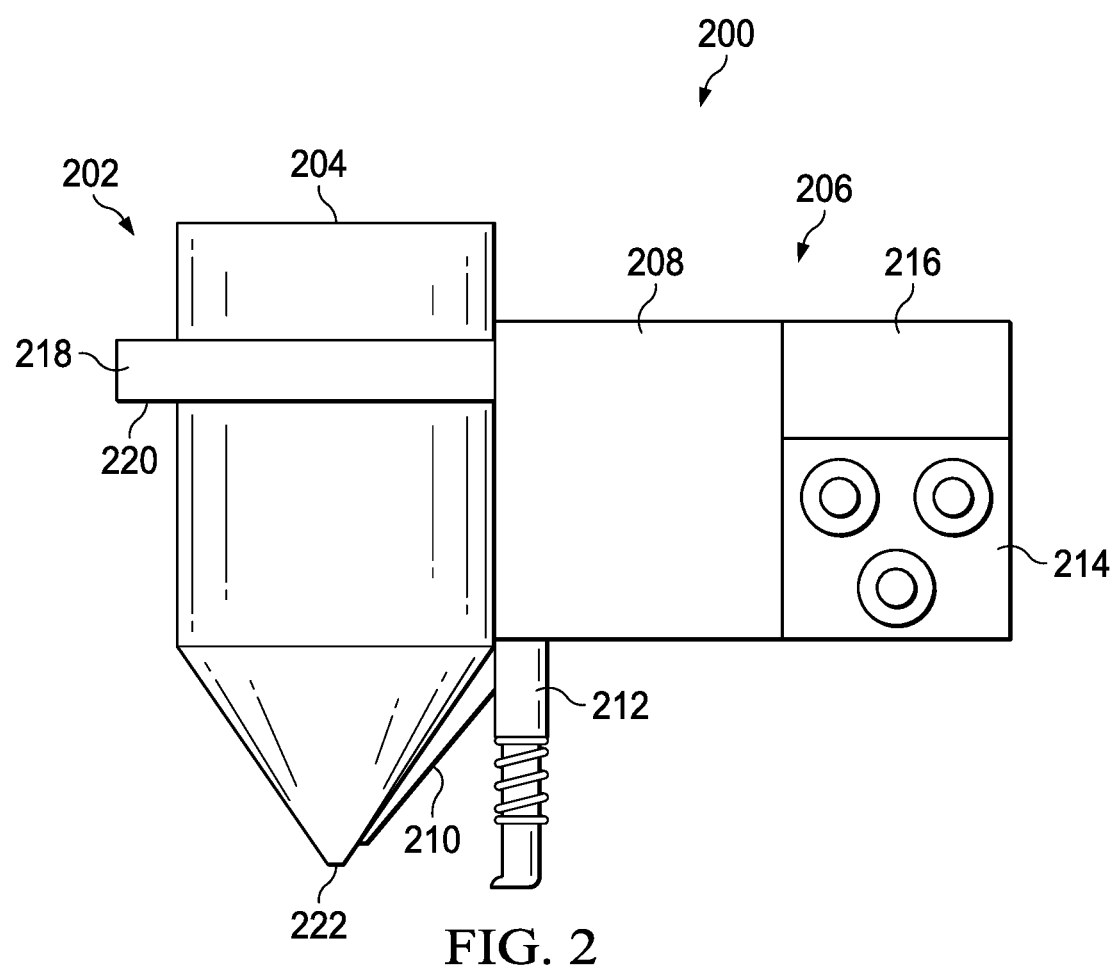
FIG. 2 is an illustration of a wire embedding system in accordance with an illustrative embodiment.

Turning now to FIG. 2, an illustration of a wire embedding system is depicted in accordance with an illustrative embodiment. View 200 of wire embedding system 202 is a simplified block diagram of one physical implementation of wire embedding system 102. Wire embedding system 202 comprises heating element 204 and wire positioning system 206. Heating element 204 represents heating element 120 of FIG. 1. In the depicted illustrative example, wire positioning system 206 is moveably connected to heating element 204. As depicted, wire positioning system 206 rotatable relative to heating element 204. In some illustrative examples, depending on the trajectory of wire embedding system 202 and a shape of a respective substrate, rotation of wire positioning system 206 about heating element 204 is desirable.

Wire positioning system 206 comprises movement system 208, edge press bar 210, wire guide arm 212, tension control box 214, and wire spool 216. Movement system 208 is configured to control rotation of wire positioning system 206 relative to heating element 204. Wire positioning system 206 rotates about heating element 204 using rotation mechanism 218. As depicted, rotation mechanism 218 takes the form of turning roll 220.

Movement system 208 is configured to control independent movement of edge press bar 210 and wire guide arm 212. Movement system 208 comprises at least one of a motor or actuators.

Wire guide arm 212 is disposed distance 221 away from heating element 204. Wire guide arm 212 may be described as laterally separated from heating element 204.

Wire guide arm 212 is moved towards or away from a substrate (not depicted) to apply or release pressure to a wire (not depicted) extending from tension control box 214 through an alignment feature of wire guide arm 212.

As depicted, wire guide arm 212 has spring 223. Spring 223 is configured to absorb some pressure that would be otherwise applied to a substrate by wire guide arm 212. In some illustrative examples, when wire guide arm 212 is actuated towards a substrate, an undesirable amount of pressure would be imparted to at least one of the substrate or wire embedding system 202 due to the position of wire embedding system 202. An undesirable amount of pressure may undesirably affect at least one of the substrate or wire embedding system 202. Spring 223 absorbs some of an undesirable amount of pressure to reduce undesirable effects to the substrate and wire embedding system 202.

Wire guide arm 212 is moved towards or away from a substrate to position the wire closer to the substrate. Wire guide arm 212 is configured to guide the wire from tension control box 214 to beneath contact surface 222 of heating element 204.

As depicted, heating element 204 is movable relative to a substrate. To apply heat to a wire, heating element 204 may be moved towards the wire (not depicted) and the substrate (not depicted).

The wire is supplied by wire spool 216 and extends through tension control box 214 to wire guide arm 212. Tension control box 214 applies a desired amount of tension to the wire (not depicted). The desired amount of tension keeps the wire straight and in a desired position. The desired amount of tension will also lift up any excess wire that has been embedded beyond an intended position.

Edge press bar 210 is moved towards or away from the substrate to apply or release pressure on a wire on the substrate. Edge press bar 210 applies pressure to the wire to maintain the position of the wire once the wire is embedded and during cooling of the substrate.

Turning now to FIGS. 3-9, wire embedding system 202 is depicted embedding a second portion of wire in a substrate. FIGS. 3-9 depict physical implementations of wire embedding system 102, wire 104, substrate 106, and second location 168.

Figure 3:
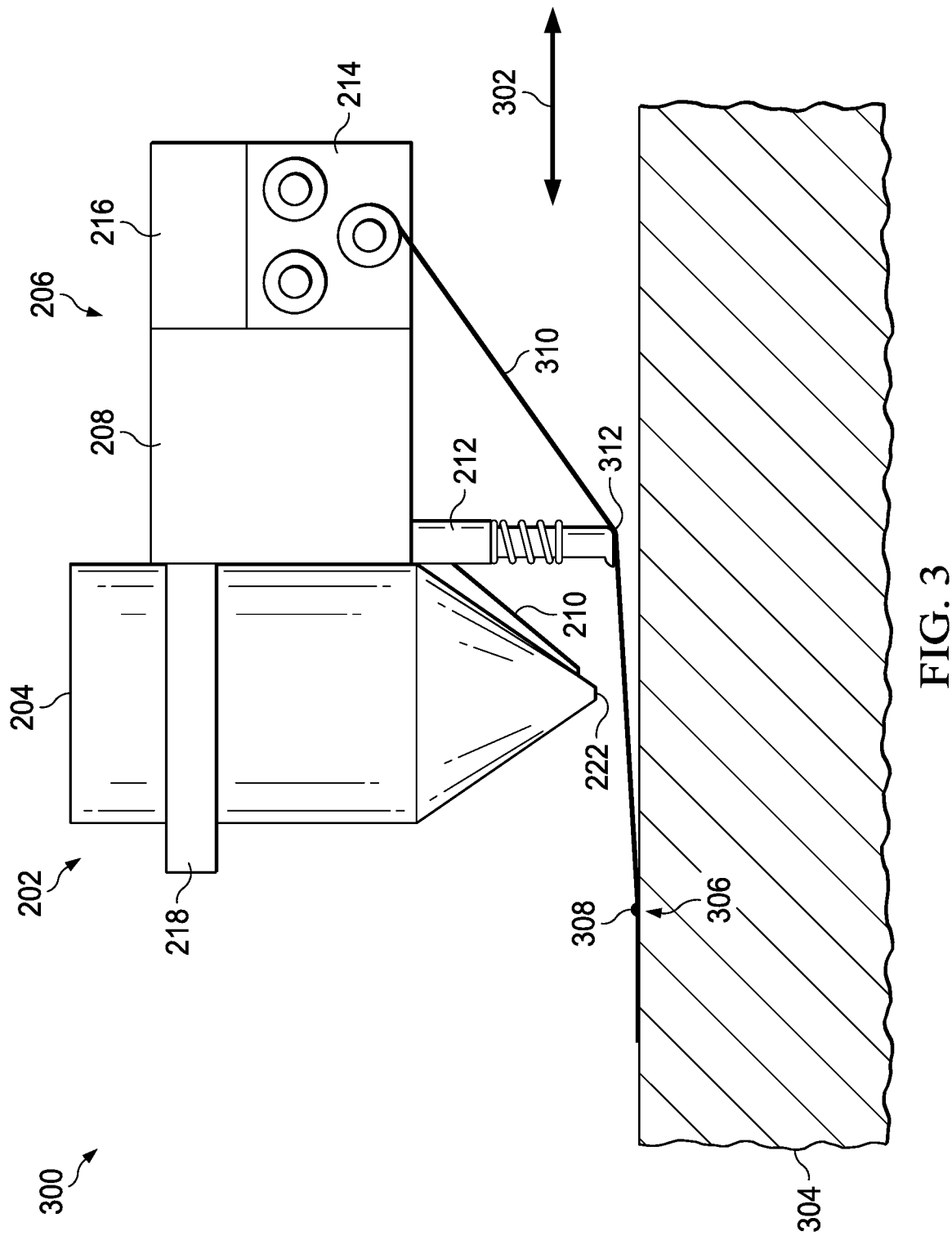
FIG. 3 is an illustration of a wire embedding system moving in a first direction relative to a substrate in accordance with an illustrative embodiment.

Turning now to FIG. 3, an illustration of a wire embedding system moving in a first direction relative to a substrate is depicted in accordance with an illustrative embodiment. In view 300, wire embedding system 202 moves in first direction 302 relative to substrate 304. In view 300, wire embedding system 202 moves in first direction 302 away from first location 306 with first portion 308 of wire 310.

First portion 308 of wire 310 was embedded in first location 306 by a previous embedding instance. After embedding first portion 308 of wire 310 in substrate 304, heating element 204, edge press bar 210, and wire guide arm 212 have been lifted away from substrate 304 to allow movement. In some illustrative examples after lifting each of heating element 204, edge press bar 210, and wire guide arm 212 independently away from substrate 304, wire embedding system 202 is lifted as a whole to allow movement.

As wire embedding system 202 moves in first direction 302, tension control box 214 maintains tension in wire 310. As can be seen, wire 310 extends from tension control box 214 through alignment mechanism 312 of wire guide arm 212, beneath contact surface 222 of heating element 204 and to first location 306.

Figure 4:
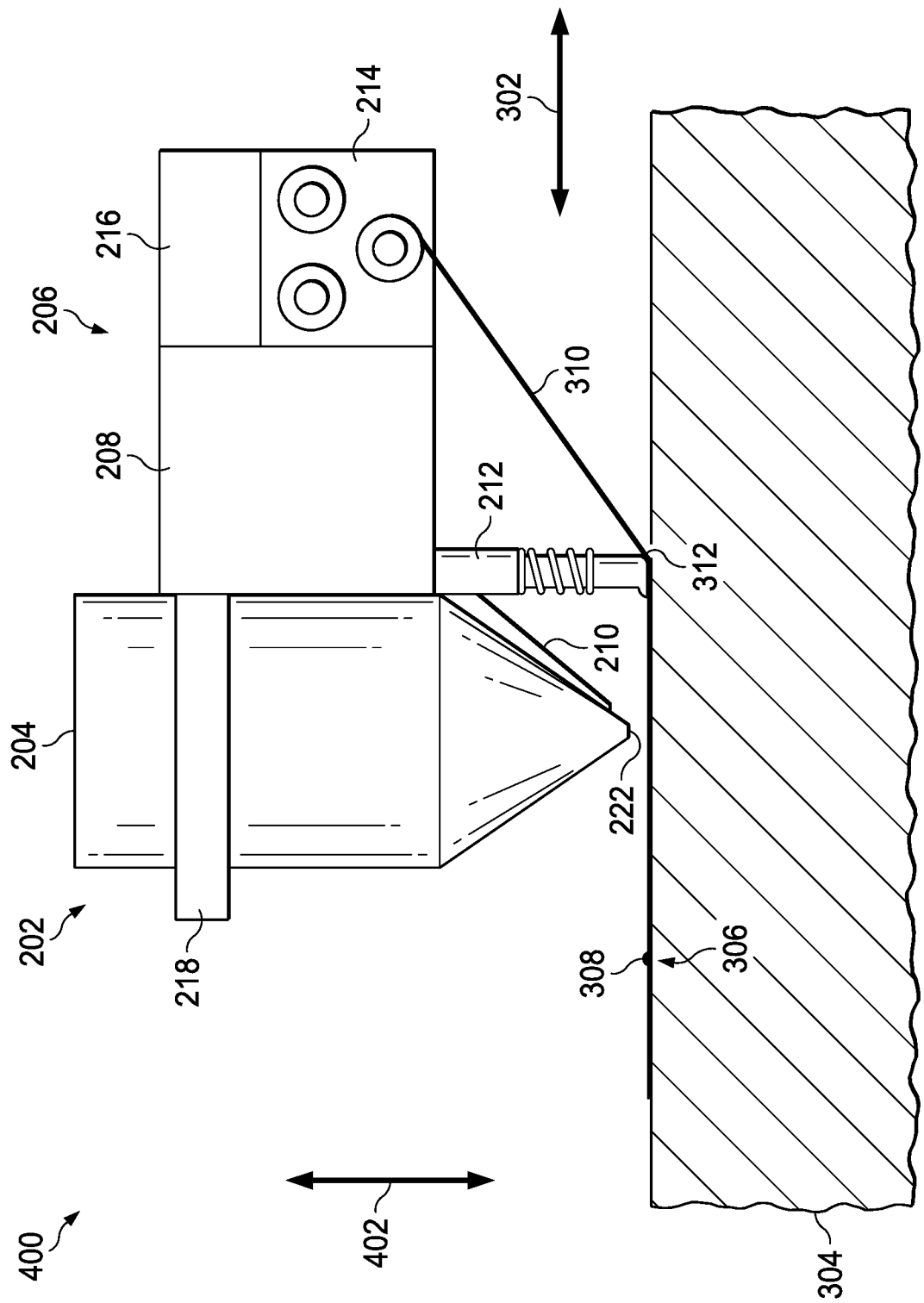
FIG. 4 is an illustration of a wire guide arm of the wire embedding system moving towards a substrate in accordance with an illustrative embodiment.

Turning now to FIG. 4, an illustration of a wire guide arm of the wire embedding system moving towards a substrate is depicted in accordance with an illustrative embodiment. In view 400, wire guide arm 212 moves in second direction 402 towards substrate 304. Wire guide arm 212 moves in second direction 402 to move wire 310 closer to substrate 304.

Figure 5:
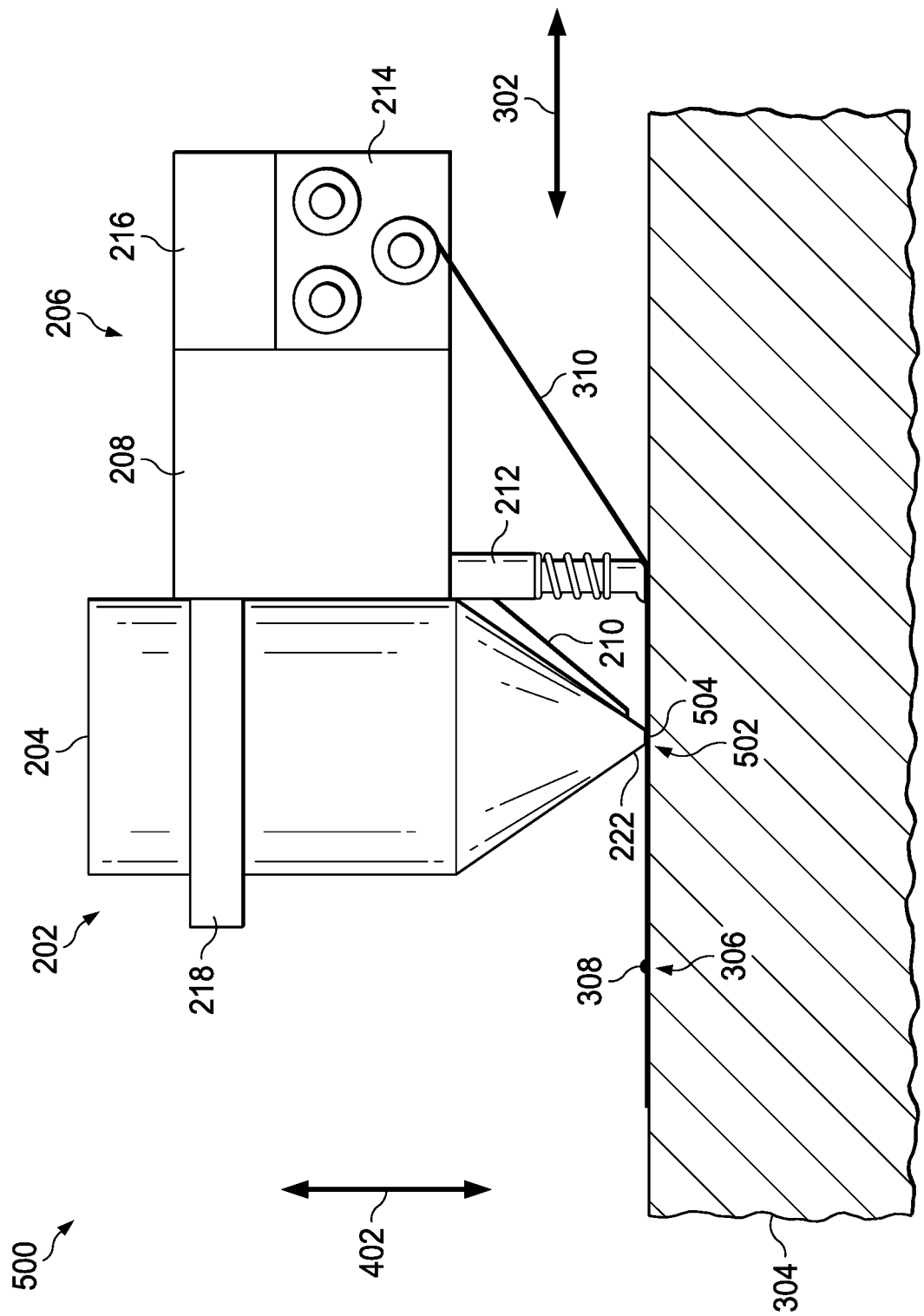
FIG. 5 is an illustration of a heating element of the wire embedding system moving towards the substrate in accordance with an illustrative embodiment.

Turning now to FIG. 5, an illustration of a heating element of the wire embedding system moving towards the substrate is depicted in accordance with an illustrative embodiment. In view 500, heating element 204 moves in second direction 402 towards substrate 304. As depicted, heating element 204 contacts wire 310 at second location 502.

While heating element 204 is in contact with wire 310, heating element 204 heats wire 310 and substrate 304. When wire 310 and substrate 304 are heated to a desirable temperature, pressure is applied to wire 310 by contact surface 222 of heating element 204. By applying pressure to wire 310, heating element 204 embeds wire 310 in substrate 304. By applying pressure to wire 310, heating element 204 embeds second portion 504 of wire 310 at second location 502 in substrate 304.

Figure 6:
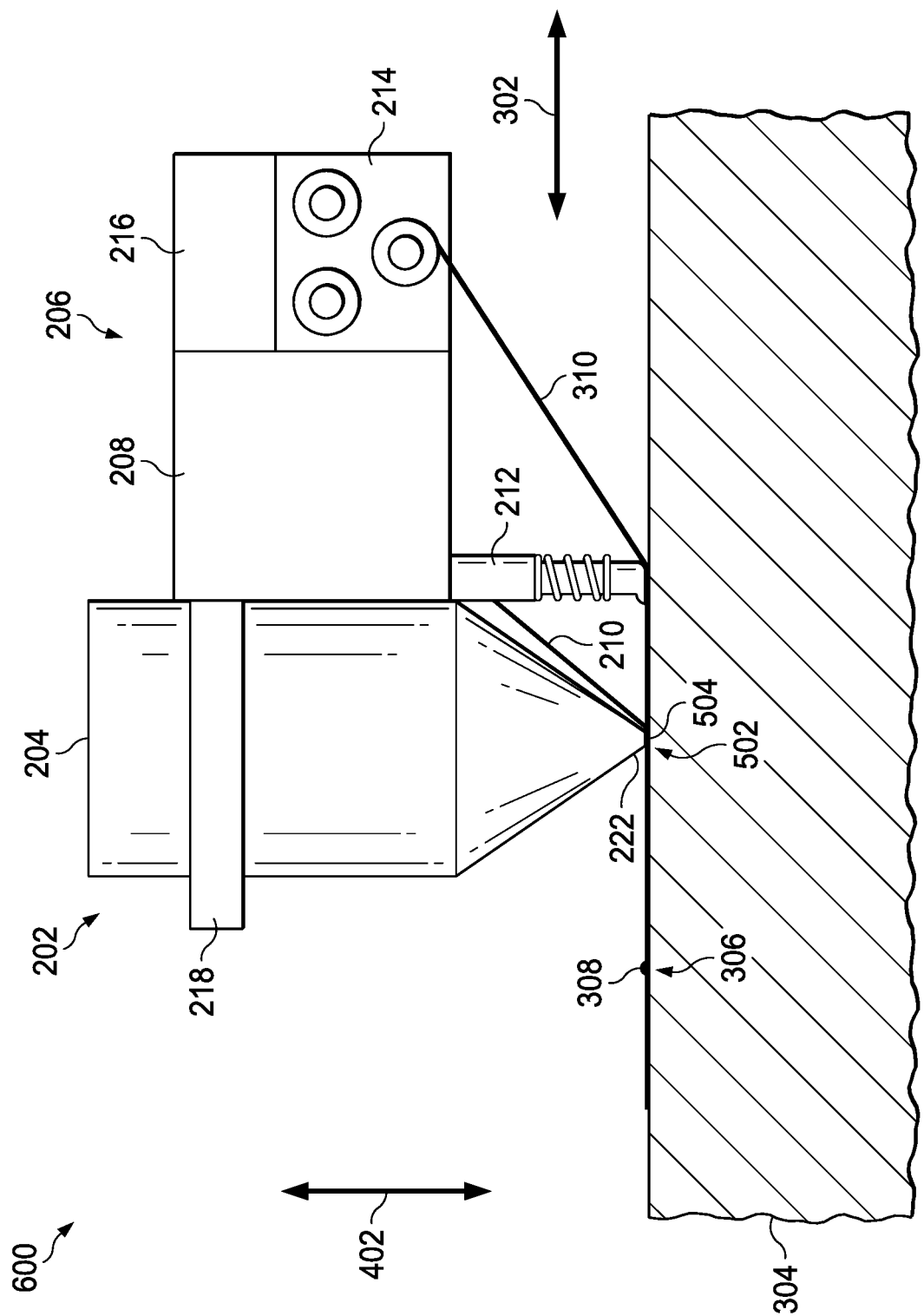
FIG. 6 is an illustration of an edge press bar of the wire embedding system moving towards the substrate in accordance with an illustrative embodiment.

Turning now to FIG. 6, an illustration of an edge press bar of the wire embedding system moving towards the substrate is depicted in accordance with an illustrative embodiment. In view 600, edge press bar 210 moves in second direction 402 towards substrate 304 to apply pressure to wire 310 at second location 502. Edge press bar 210 applies pressure to wire 310 near contact surface 222 of heating element 204.

Figure 7:
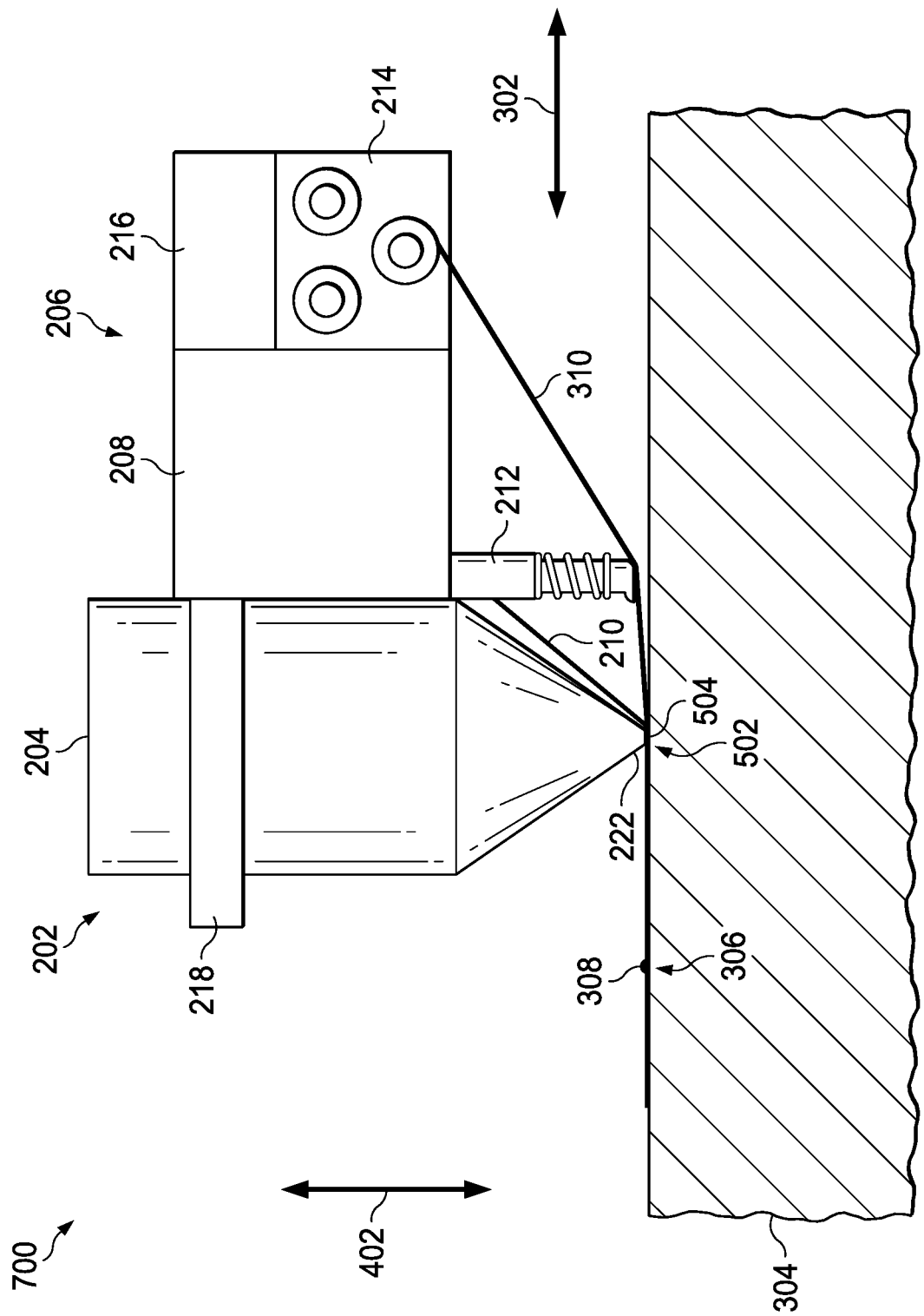
FIG. 7 is an illustration of lifting the wire guide arm away from the substrate in accordance with an illustrative embodiment.

Turning now to FIG. 7, an illustration of lifting the wire guide arm away from the substrate is depicted in accordance with an illustrative embodiment. In view 700, wire guide arm 212 is lifted away from substrate 304. By lifting wire guide arm 212 away from substrate 304 in second direction 402, tension provided by tension control box 214 pulls wire 310 past second location 502 away from substrate 304. Tension provided by tension control box 214 pulls any excess wire 310 past second portion 504 away from substrate 304.

Figure 8:
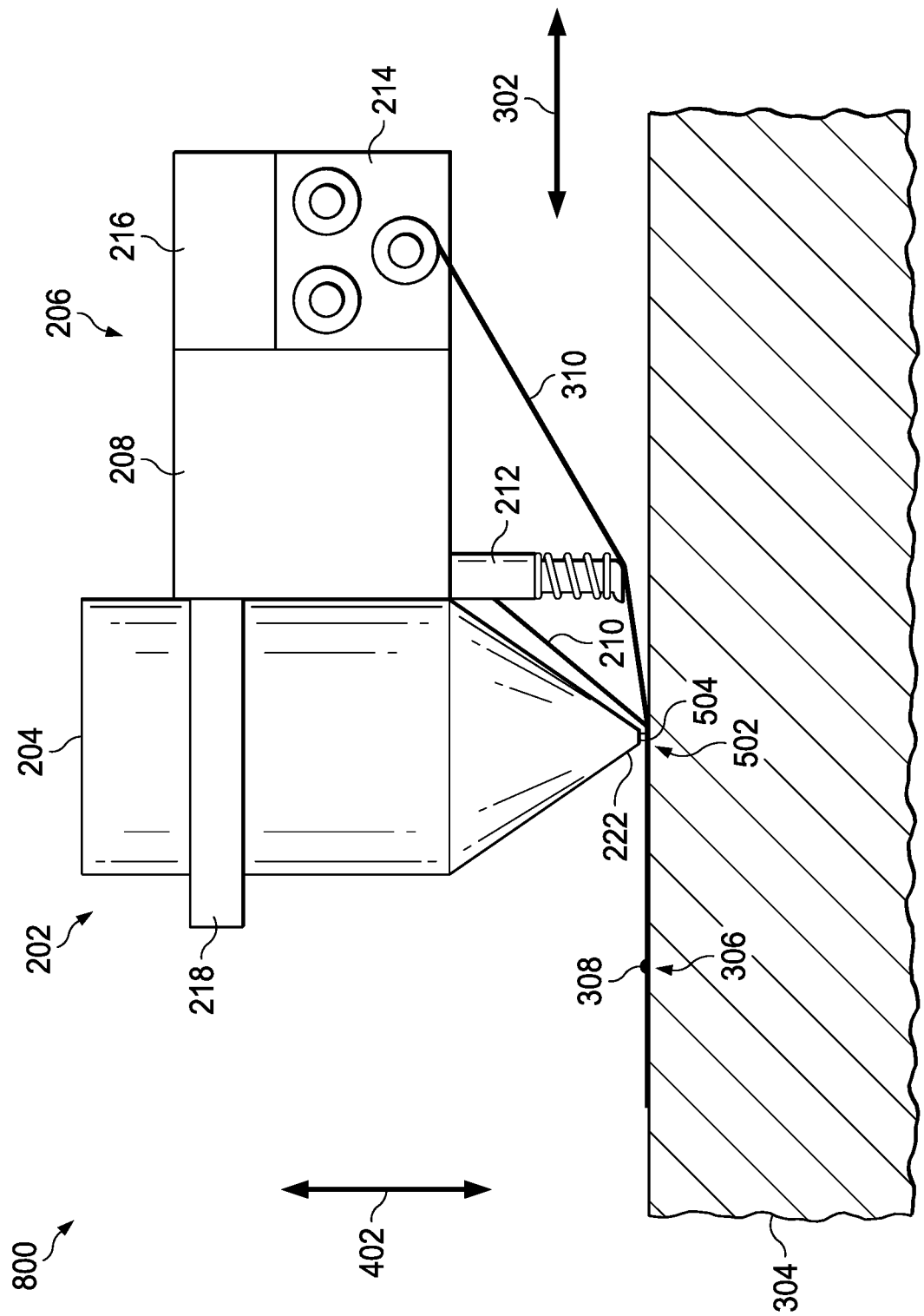
FIG. 8 is an illustration of lifting a heating element away from the substrate in accordance with an illustrative embodiment.

Turning now to FIG. 8, an illustration of lifting a heating element away from the substrate is depicted in accordance with an illustrative embodiment. In view 800, heating element 204 is lifted away from substrate 304. By lifting heating element 204 away from substrate 304 in second direction 402, heat is no longer applied to wire 310 and substrate 304.

In view 800, edge press bar 210 remains in contact with wire 310. Edge press bar 210 maintains pressure against wire 310 to maintain the position of second portion 504 in second location 502 as substrate 304 cools.

Figure 9:
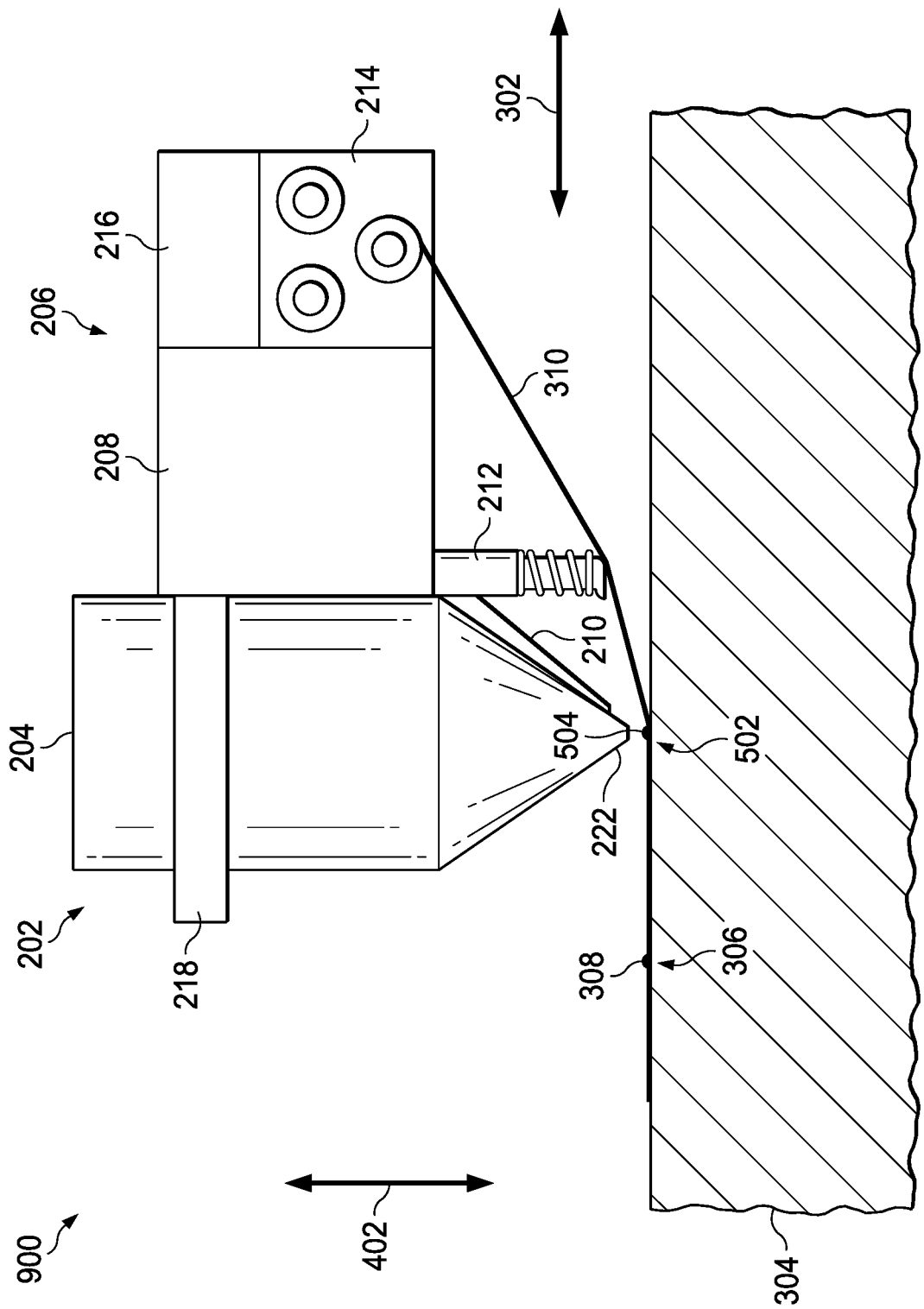
FIG. 9 is an illustration of moving the wire embedding system in the first direction relative to the substrate in accordance with an illustrative embodiment.

Turning now to FIG. 9, an illustration of moving the wire embedding system in the first direction relative to the substrate is depicted in accordance with an illustrative embodiment. In view 900, second portion 504 of wire 310 is embedded in second location 502 of substrate 304. After substrate 304 cooled, edge press bar 210 was lifted away from substrate 304.

As depicted, wire embedding system 202 is moveable relative to substrate 304. Wire embedding system 202 may be moved in first direction 302 to embed wire 310 in other predetermined locations of substrate 304.

The illustrations of wire embedding system 202 and substrate 304 in FIGS. 2-9 are not meant to imply physical or architectural limitations to the manner in which an illustrative embodiment may be implemented. For example, substrate 304 may have any desirable size or shape. Although substrate 304 is depicted as planar, non-depicted examples may include any desirable curvature including complex curvatures. As another example, the depiction of wire embedding system 202 is a block diagram. As yet another example, wire embedding system 202 may be connected to any desirable driving mechanism such as a gantry system, a robotic arm, an autonomous robotic vehicle, or any other desirable driving mechanism.

As yet a further example, in some illustrative examples wire embedding system 202 may take the form of more than one end effector. In some illustrative examples heating element 204 and wire positioning system 206 may not be physically connected.

Figure 10:
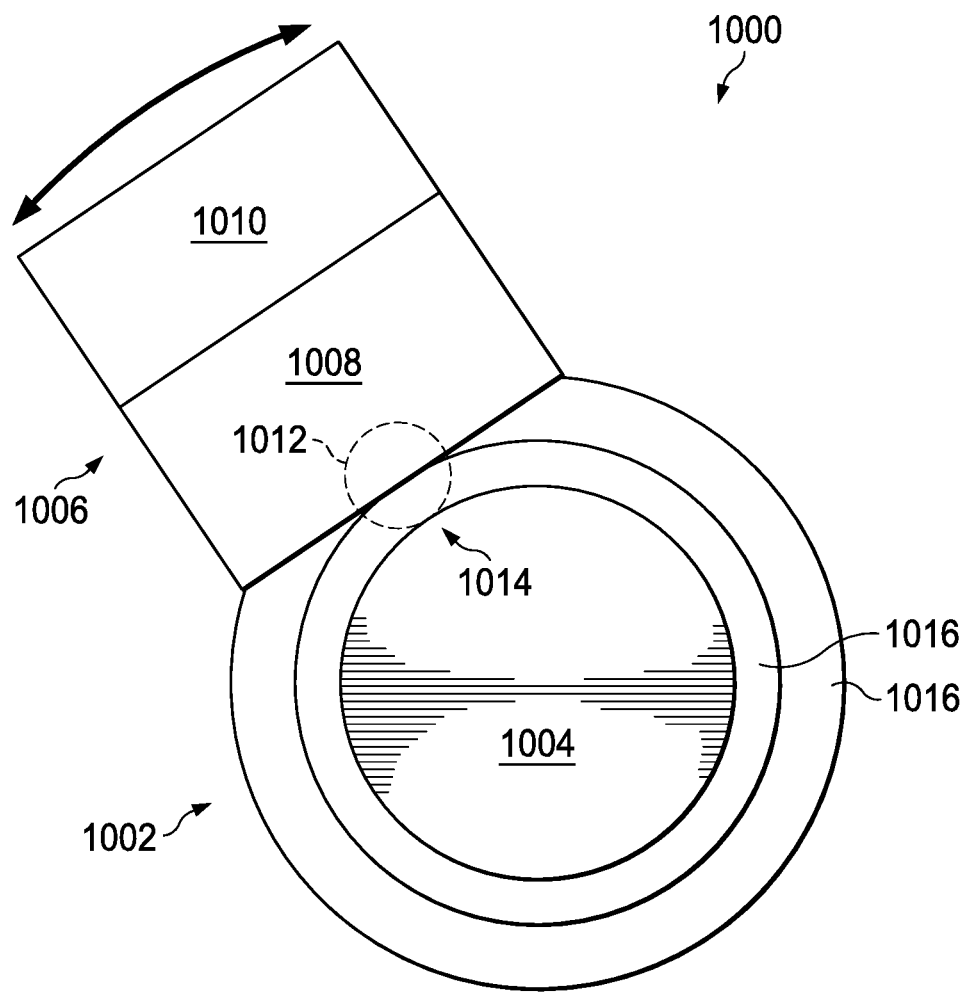
FIG. 10 is an illustration of a top view of a wire embedding system in accordance with an illustrative embodiment.

Turning now to FIG. 10, an illustration of a top view of a wire embedding system is depicted in accordance with an illustrative embodiment. View 1000 of wire embedding system 1002 is a simplified diagram of one physical implementation of wire embedding system 102. Wire embedding system 1002 comprises heating element 1004 and wire positioning system 1006. Heating element 1004 represents heating element 120 of FIG. 1. In some illustrative examples, view 1000 of wire embedding system 1002 is a top view of wire embedding system 202 of FIG. 2.

In the depicted illustrative example, wire positioning system 1006 is moveably connected to heating element 1004. As depicted, wire positioning system 1006 is rotatable relative to heating element 1004. In some illustrative examples, depending on the trajectory of wire embedding system 1002 and a shape of a respective substrate, rotation of wire positioning system 1006 about heating element 1004 is desirable.

Wire positioning system 1006 comprises movement system 1008 and wire spool 1010. Wire positioning system 1006 may further include an edge press bar (not depicted), a wire guide arm (not depicted), and a tension control box (not depicted). Movement system 1008 is configured to control rotation of wire positioning system 1006 relative to heating element 1004. Wire positioning system 1006 rotates about heating element 1004 using rotation mechanism 1012. As depicted, rotation mechanism 1012 takes the form of turning wheel 1014 and rotation bearing 1016.

Movement system 1008 is configured to control independent movement of an edge press bar and a wire guide arm. Movement system 1008 comprises at least one of a motor or actuators.

Heating element 1004 is movable relative to a substrate. To apply heat to a wire, heating element 1004 may be moved towards the wire (not depicted) and the substrate (not depicted). The wire is supplied by wire spool 1010.

Turning now to FIGS. 11-14, wire embedding system 1002 is depicted embedding a second portion of wire in a substrate. FIGS. 11-14 depict physical implementations of wire embedding system 102, wire 104, substrate 106, and second location 168.

Figure 11:
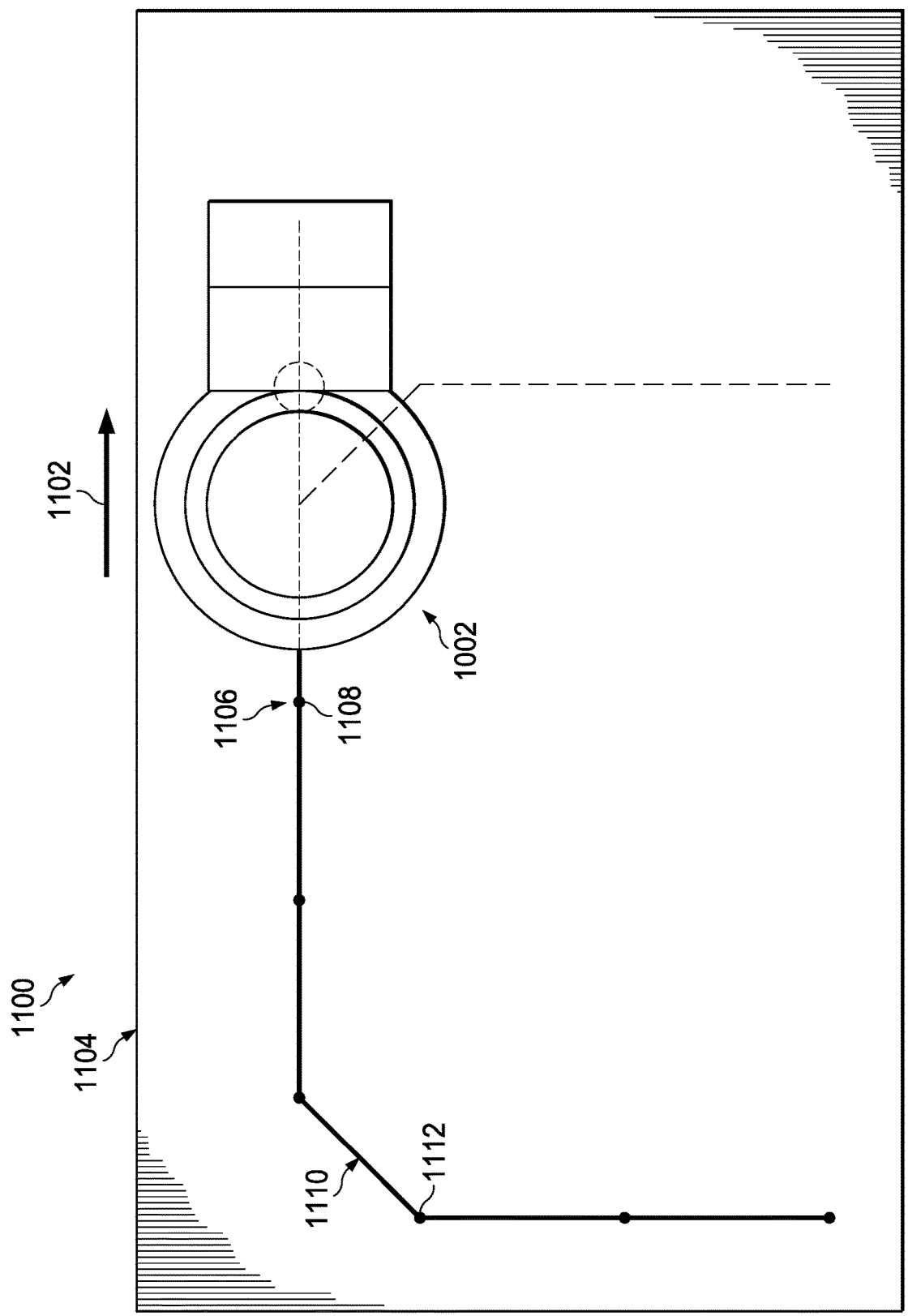
FIG. 11 is an illustration of a top view of a wire embedding system moving relative to a substrate in accordance with an illustrative embodiment.

Turning now to FIG. 11, an illustration of a top view of a wire embedding system moving relative to a substrate is depicted in accordance with an illustrative embodiment. In view 1100, wire embedding system 1002 moves in first direction 1102 relative to substrate 1104. In view 1100, wire embedding system 1002 moves in first direction 1102 away from first location 1106 with first portion 1108 of wire 1110.

In view 1100, wire 1110 has been intermittently embedded in substrate 1104 at locations 1112 by wire embedding system 1002. Locations 1112 include first location 1106.

First portion 1108 of wire 1110 was embedded in first location 1106 by a previous embedding instance. After embedding first portion 1108 of wire 1110 in substrate 1104, portions of wire embedding system 1002 have been lifted away from substrate 1104 to allow movement. In some illustrative examples after lifting portions of wire embedding system 1002 independently away from substrate 1104, wire embedding system 1002 is lifted as a whole to allow movement. As wire embedding system 1002 moves in first direction 1102, a tension control box maintains tension in wire 1110.

Figure 12:
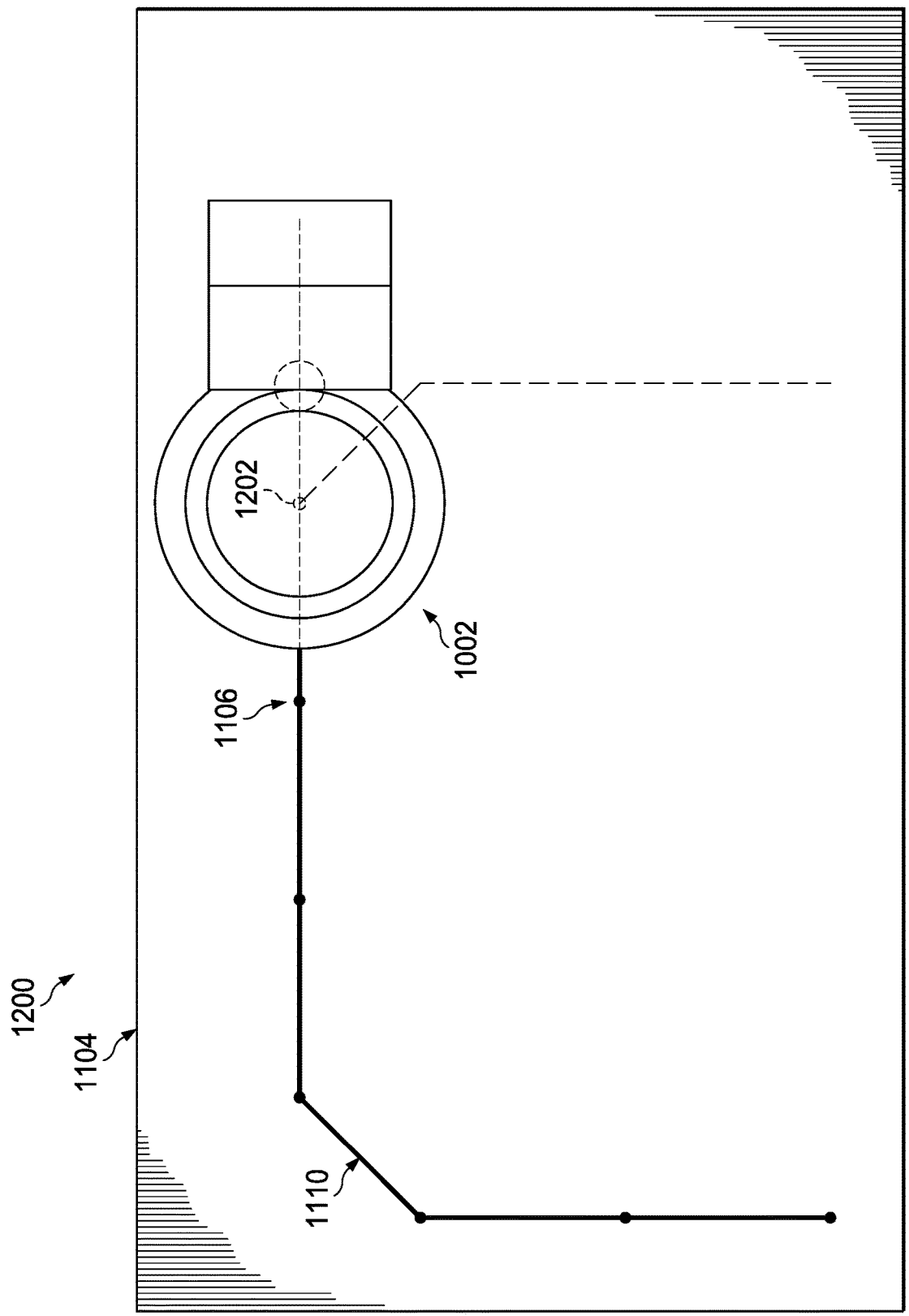
FIG. 12 is an illustration of a top view of a wire embedding system intermittently embedding a wire in a substrate in accordance with an illustrative embodiment.

Turning now to FIG. 12, an illustration of a top view of a wire embedding system intermittently embedding a wire in a substrate is depicted in accordance with an illustrative embodiment. View 1200 is a view of wire embedding system 1002 as wire embedding system 1002 embeds wire 1110 in substrate 1104 at second location 1202.

Figure 13:
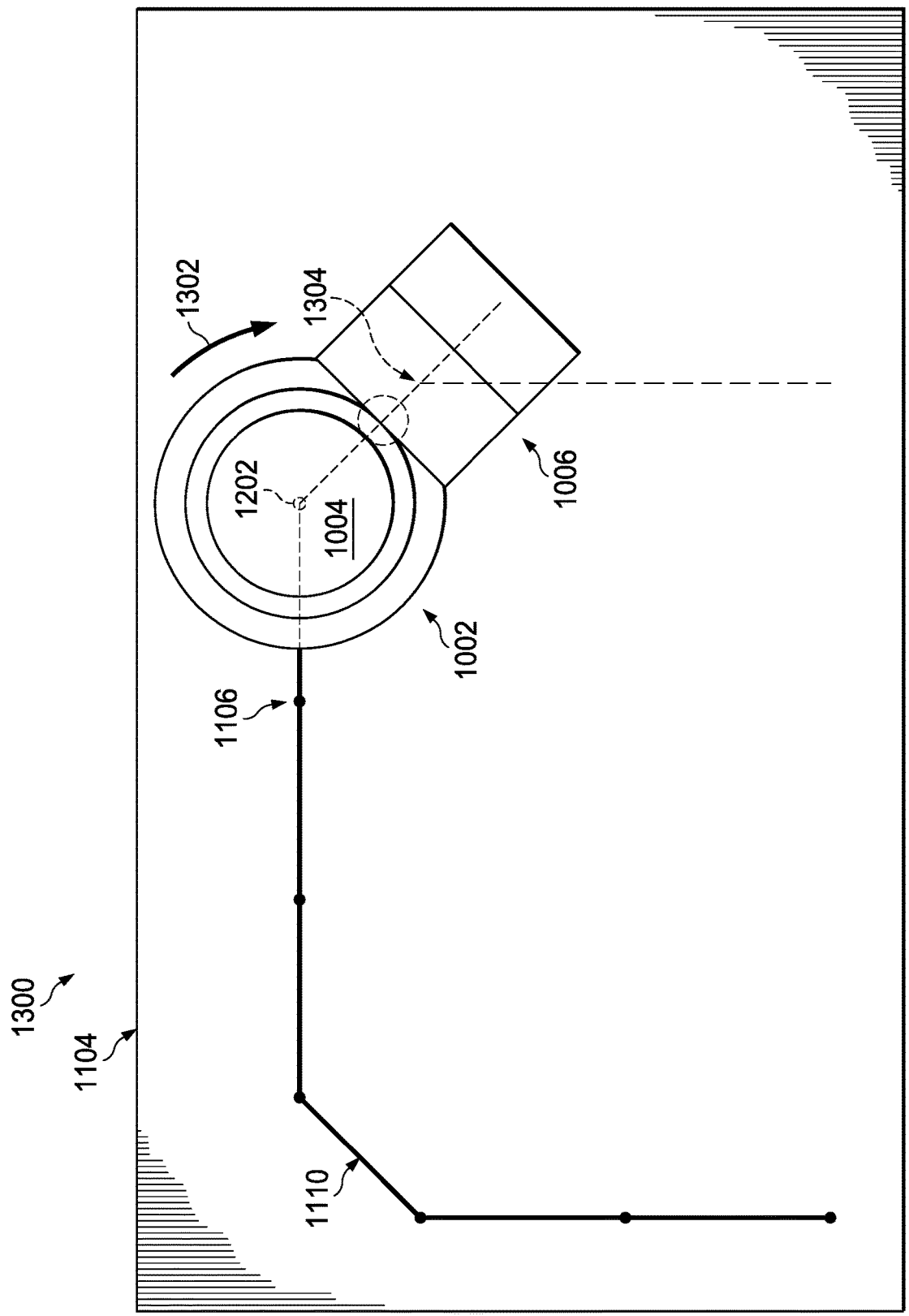
FIG. 13 is an illustration of a top view of a wire embedding system turning relative to a substrate in accordance with an illustrative embodiment.

Turning now to FIG. 13, an illustration of a top view of a wire embedding system turning relative to a substrate is depicted in accordance with an illustrative embodiment. In view 1300 wire positioning system 1006 has rotated relative to heating element 1004. Wire positioning system 1006 has rotated in direction 1302 relative to heating element 1004 to prepare to embed wire 1110 in substrate 1104 at third location 1304.

Figure 14:
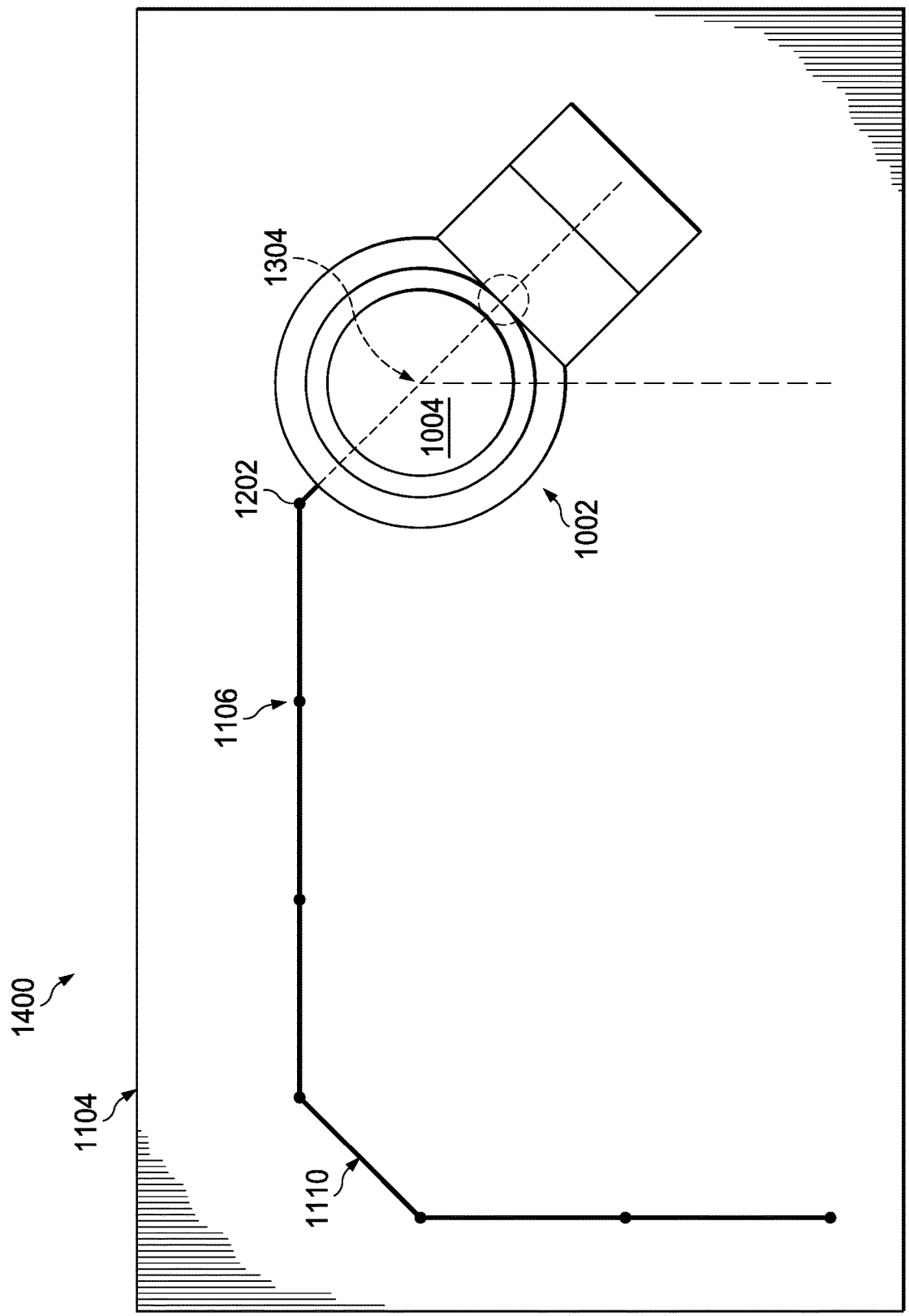
FIG. 14 is an illustration of a top view of a wire embedding system moving relative to a substrate in accordance with an illustrative embodiment.

Turning now to FIG. 14, an illustration of a top view of a wire embedding system moving relative to a substrate is depicted in accordance with an illustrative embodiment. In view 1400, wire embedding system 1002 moves relative to substrate 1104 and towards third location 1304. In view 1400, wire embedding system 1002 moves away from second location 1202 while the tension control box maintains tension in wire 1110.

The illustrations of wire embedding system 1002 and substrate 1104 in FIGS. 11-14 are not meant to imply physical or architectural limitations to the manner in which an illustrative embodiment may be implemented. For example, substrate 1104 may have any desirable size or shape. Although substrate 1104 is depicted as planar, non-depicted examples may include any desirable curvature including complex curvatures. As another example, the depiction of wire embedding system 1002 is a block diagram. As yet another example, wire embedding system 1002 may be connected to any desirable driving mechanism such as a gantry system, a robotic arm, an autonomous robotic vehicle, or any other desirable driving mechanism.

As yet a further example, in some illustrative examples wire embedding system 1002 may take the form of more than one end effector. In some illustrative examples heating element 1004 and wire positioning system 1006 may not be physically connected.

Figure 15:
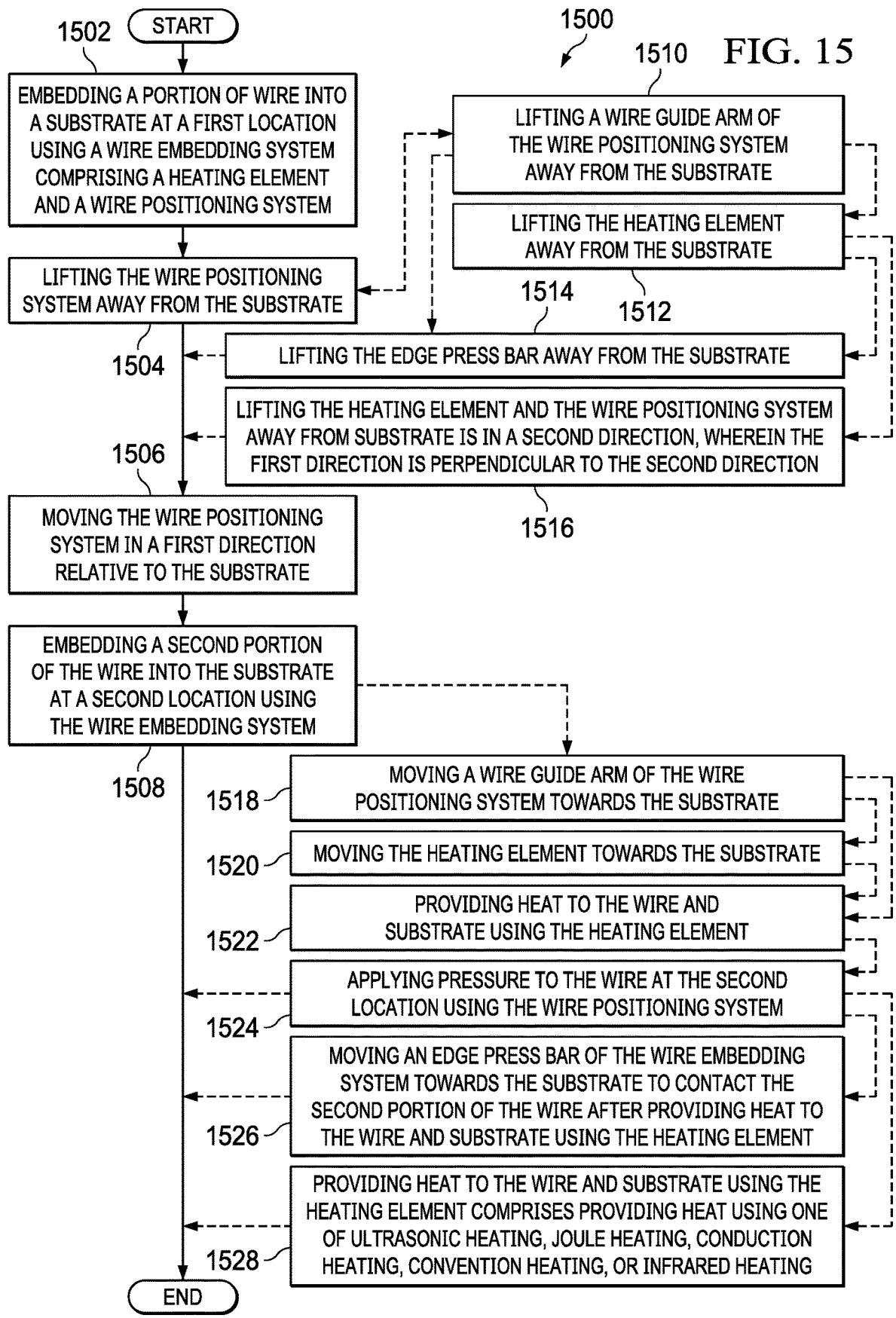
FIG. 15 is an illustration of a flowchart of a method for embedding a wire in a substrate in accordance with an illustrative embodiment.

Turning now to FIG. 15, an illustration of a flowchart of a method for embedding a wire in a substrate is depicted in accordance with an illustrative embodiment. Method 1500 may be implemented using wire embedding system 102 of FIG. 1. Method 1500 may be implemented in wire embedding system 202 of FIGS. 2-9. Method 1500 may be implemented in wire embedding system 1002 of FIGS. 10-14.

Method 1500 embeds a first portion of wire into a substrate at a first location using a wire embedding system comprising a heating element and a wire positioning system (operation 1502). In some illustrative examples, a first portion of wire is embedded into a substrate at a first location using a wire embedding system comprising a heating element and a wire positioning system rotatably connected to the heating element.

Method 1500 lifts the wire positioning system away from the substrate (operation 1504). In illustrative examples in which the wire positioning system is rotatably connected to the heating element, the heating element and the wire positioning system are both lifted away from the substrate. By lifting at least one of heating element and the wire positioning system away from the substrate, the wire embedding system is moveable relative to the substrate. By lifting the heating element and the wire positioning system away from the substrate, heat and pressure is removed from the wire and the substrate.

Method 1500 moves the wire positioning system in a first direction relative to the substrate (operation 1506). By moving the wire positioning system in the first direction, the wire positioning system moves between locations of predetermined locations, wherein each location of the predetermined locations will receive an embedding instance of a series of sequential embedding instances. While the wire positioning system is moved in the first direction, embedding is not performed. While the wire positioning system is moved in the first direction, tension is applied to the wire to maintain a desired position of the wire relative to the heating element.

In some illustrative examples, the wire embedding system is moved in the first direction. By moving the wire embedding system in the first direction, the wire embedding system moves between locations of predetermined locations, wherein each location of the predetermined locations will receive an embedding instance of a series of sequential embedding instances.

Method 1500 embeds a second portion of the wire into the substrate at a second location using the wire embedding system (operation 1508). The first location and the second location are separated by a set distance. Afterwards, method 1500 terminates.

In some illustrative examples, lifting the wire positioning system away from the substrate (operation 1504) comprises lifting a wire guide arm of the wire positioning system away from the substrate (operation 1510); and method 1500 further comprises lifting the heating element away from the substrate (operation 1512) after lifting the wire guide arm away from the substrate.

In some illustrative examples, lifting the wire positioning system away from the substrate (operation 1504) comprises: lifting the wire guide arm away from the substrate (operation 1510); lifting the edge press bar away from the substrate (operation 1514) and method 1500 further comprises lifting the heating element away from the substrate (operation 1512), wherein lifting the edge press bar away from the substrate is performed after lifting the heating element away from the substrate. In some illustrative examples, lifting the heating element and the wire positioning system away from substrate is in a second direction, wherein the first direction is perpendicular to the second direction (operation 1516).

In some illustrative examples, the first location is the corner of a shape. In these illustrative examples, it is desirable to bend the wire to form the corner. In some illustrative examples, when the first location is a corner of a shape, the wire embedding system turns relative to the substrate after operation 1504. As the wire embedding system turns relative to the substrate, a tension control box of the wire positioning system maintains tension on the wire. In some illustrative examples, as the wire embedding system turns relative to the substrate, the edge press bar remains in contact with the wire.

In some illustrative examples, embedding the second portion of the wire into the substrate at the second location (operation 1508) comprises: moving a wire guide arm of the wire positioning system towards the substrate (operation 1518); providing heat to the wire and substrate using the heating element (operation 1522); and applying pressure to the wire at the second location using wire positioning system (operation 1524). In some illustrative examples, providing heat to the wire and substrate using the heating element comprises providing heat using one of ultrasonic heating, joule heating, conduction heating, convention heating, or infrared heating (operation 1528). Additionally, in some illustrative examples, the heating element may be moved towards the substrate (operation 1520). In some illustrative examples, pressure may be applied to the wire at the second location using a contact surface of the heating element.

In some illustrative examples, embedding the second portion of the wire into the substrate at the second location further comprises: moving an edge press bar of the wire embedding system towards the substrate to contact the second portion of the wire after providing heat to the wire and substrate using the heating element (operation 1526).

Figure 16:
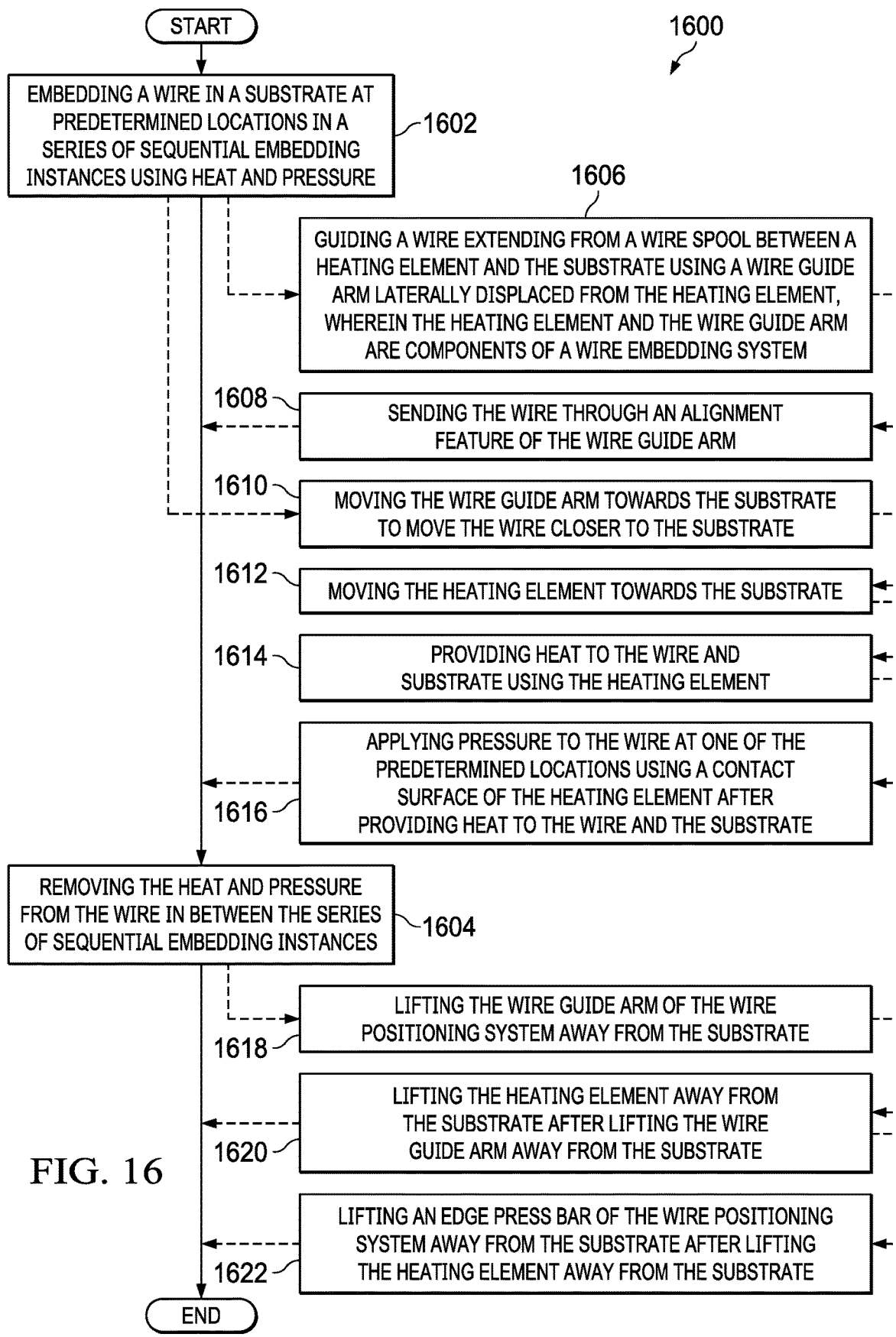
FIG. 16 is an illustration of a flowchart of a method for embedding a wire in a substrate in accordance with an illustrative embodiment.

Turning now to FIG. 16, an illustration of a flowchart of a method for embedding a wire in a substrate is depicted in accordance with an illustrative embodiment. Method 1600 may be implemented using wire embedding system 102 of FIG. 1. Method 1600 may be implemented in wire embedding system 202 of FIGS. 2-9. Method 1600 may be implemented in wire embedding system 1002 of FIGS. 10-14.

Method 1600 embeds a wire in a substrate at predetermined locations in a series of sequential embedding instances using heat and pressure (operation 1602). Method 1600 removes the heat and pressure from the wire in between the series of sequential embedding instances (operation 1604). Afterwards, method 1600 terminates.

In some illustrative examples, embedding the wire in the substrate comprises guiding a wire extending from a wire spool between a heating element and the substrate using a wire guide arm laterally displaced from the heating element, wherein the heating element and the wire guide arm are components of a wire embedding system (operation 1606). In some illustrative examples, guiding the wire extending from the wire spool between the heating element and the substrate using the wire guide arm comprises sending the wire through an alignment feature of the wire guide arm (operation 1608).

In some illustrative examples, embedding the wire in the substrate comprises: moving the wire guide arm towards the substrate to move the wire closer to the substrate (operation 1610); moving the heating element towards the substrate (operation 1612); providing heat to the wire and substrate using the heating element (operation 1614); and applying pressure to the wire at one of the predetermined locations using a contact surface of the heating element after providing heat to the wire and the substrate (operation 1616).

In some illustrative examples, removing the heat and pressure from the wire comprises: lifting the wire guide arm of the wire positioning system away from the substrate (operation 1618); and lifting the heating element away from the substrate after lifting the wire guide arm away from the substrate (operation 1620). In some illustrative examples, removing the heat and pressure from the wire further comprises lifting an edge press bar of the wire positioning system away from the substrate after lifting the heating element away from the substrate (operation 1622).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1500 or method 1600 are performed. For example, operations 1510 through 1528 may be optional. In some illustrative examples, operations 1606 through 1622 may be optional.

The illustrative examples reduce instances of embedded wires becoming dislodged due to continuous embedding. The illustrative examples also increase the stability of wire embedding.

The illustrative examples introduce a method of discontinuous metal wire embedding that performs an intermittent process at prescribed intervals to embed the wire instead of embedding the wire continuously. To perform the intermittent embedding process, the illustrative examples present a wire positioning system on the side of a given selective energy tool. The wire positioning system can rotate around the energy tool depending on the tool trajectory. The illustrative examples present a wire positioning system comprising a wire guide to place metal wire under the center of a selective energy tool, tension controller to pull the wire with certain amount of tension, and an edge press bar allow accurate positioning and shaping.

The illustrative examples present a wire positioning system capable of producing complex shapes with thicker wires. The edge press bar of the wire positioning system enables the capability of producing complex shapes with thicker wires.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for intermittently embedding a wire during a three-dimensional printing process, the method comprising:
   embedding a first portion of wire into a substrate at a first location using a wire embedding system comprising a three-dimensional printer including a heating element and a wire guide arm, wherein embedding the first portion of the wire comprises:
      lowering the wire guide arm toward the substrate to move the wire to the substrate, wherein the wire guide arm is configured to guide the wire from a wire spool to beneath a contact surface of the heating element, wherein the heating element is laterally separated from the wire guide arm;
      lowering the heating element to contact the wire;
      heating, with the heating element, the wire and substrate while pressure is applied to the wire by the contact surface of the heating element, wherein the heating element embeds the first portion of the wire into the substrate at the first location;
   lifting the wire embedding system away from the substrate;
   moving the wire embedding system in a first direction relative to the substrate; and
   embedding a second portion of the wire into the substrate at a second location using the wire embedding system.

2. The method of claim 1 wherein lifting the wire embedding system away from the substrate comprises lifting the wire guide arm away from the substrate, and lifting the heating element away from the substrate after lifting the wire guide arm away from the substrate.

3. The method of claim 1, wherein heating the wire and substrate using the heating element comprises providing heat using one of ultrasonic heating, joule heating, conduction heating, convention heating, or infrared heating.

4. The method of claim 1, wherein embedding the first or second portion of the wire into the substrate at the first or second location further comprises:
   moving an edge press bar of the wire embedding system towards the substrate to contact the wire after providing heat to the wire and substrate using the heating element, wherein the edge press bar moves along a surface of the heating element; and
   applying pressure, with the edge press bar, to the wire at the first or second location, adjacent to the contact surface of the heating element.

5. The method of claim 4, wherein lifting the wire embedding system away from the substrate comprises:
   lifting the wire guide arm away from the substrate;
   lifting the heating element away from the substrate; and
   lifting the edge press bar away from the substrate after lifting the heating element away from the substrate, wherein the edge press bar maintains pressure against the wire at the first or second location as the substrate cools.

6. The method of claim 5, wherein lifting the heating element and the wire guide arm away from substrate is in a second direction, wherein the first direction is perpendicular to the second direction.

7. The method of claim 1, further comprising:
   moving an edge press bar of the wire embedding system towards the substrate to contact the second portion of the wire after providing heat to the wire and substrate using the heating element, wherein the edge press bar moves along a surface of the heating element;
   applying pressure, with the edge press bar, to the wire at the second location, adjacent to the contact surface of the heating element;
   lifting the wire guide arm and heating element away from the substrate;
   turning the wire guide arm of the wire embedding system relative to the substrate while the edge press bar remains in contact with the wire;
   lifting the edge press bar away from the substrate;
   moving the wire embedding system in a second direction relative to the substrate; and
   embedding a third portion of the wire into the substrate at a third location using the wire embedding system.

8. The method of claim 1, wherein the wire guide arm has a spring configured to absorb a portion of pressure that would otherwise be applied to the substrate.

9. The method of claim 1, wherein the heating element comprises a three-dimensional printer extruder.

10. The method of claim 1, wherein a wire positioning system comprising the wire guide arm and the wire spool is configured to rotate about the heating element using a rotation mechanism.

11. The method of claim 1, wherein a tension control box provides a set amount of tension to the wire.

12. A method for intermittently embedding a wire during a three-dimensional printing process, the method comprising:
   embedding a wire in a substrate at a number of predetermined locations in a series of sequential embedding instances using heat and pressure, wherein embedding comprises:
      lowering a wire guide arm toward the substrate to move the wire to the substrate, wherein the wire guide arm is configured to guide the wire from a wire spool to beneath a contact surface of a heating element, wherein the heating element is laterally separated from the wire guide arm and wherein the heating element is part of a three-dimensional printer;
      lowering the heating element to contact the wire;
      heating, with the heating element, the wire and substrate while pressure is applied to the wire by the contact surface of the heating element, wherein the heating element embeds a portion of the wire into the substrate; and
   removing the heat and pressure from the wire in between the series of sequential embedding instances.

13. The method of claim 12, wherein guiding the wire extending from the wire spool to beneath the heating element using the wire guide arm comprises sending the wire through an alignment feature of the wire guide arm.

14. The method of claim 12, wherein removing the heat and pressure from the wire comprises:

lifting the wire guide arm away from the substrate; and
lifting the heating element away from the substrate after lifting the wire guide arm away from the substrate.

15. The method of claim 12, wherein embedding the wire into the substrate further comprises:
    moving an edge press bar towards the substrate to contact the wire after providing heat to the wire and substrate using the heating element, wherein the edge press bar moves along an angled surface of the heating element; and
    applying pressure, with the edge press bar, to the wire adjacent to the contact surface of the heating element.

16. The method of claim 15, wherein removing the heat and pressure from the wire further comprises:
    lifting the edge press bar away from the substrate after lifting the heating element away from the substrate, wherein the edge press bar maintains pressure against the wire as the substrate cools.

17. The method of claim 15, wherein embedding a wire in a substrate in a series of sequential embedding instances comprises forming a corner in the wire by:
    embedding a first portion of the wire into the substrate at a first location;
    lifting the wire guide arm, heating element, and edge press bar away from the substrate;
    moving the wire guide arm and heating element in a first direction relative to the substrate;
    embedding a second portion of the wire into the substrate at a second location;
    lifting the wire guide arm and heating element away from the substrate;
    turning the wire guide arm relative to the substrate while the edge press bar remains in contact with the wire;
    lifting the edge press bar away from the substrate;
    moving the wire guide arm and heating element in a second direction relative to the substrate; and
    embedding a third portion of the wire into the substrate at a third location.

18. The method of claim 12, wherein the wire guide arm has a spring configured to absorb a portion of pressure that would otherwise be applied to the substrate.

19. The method of claim 12, wherein a wire positioning system comprising the wire guide arm and the wire spool is configured to rotate about the heating element using a rotation mechanism.

20. The method of claim 12, wherein the heating element comprises a three-dimensional printer extruder.

\* \* \* \* \*